United States Patent [19]
Ledet et al.

[11] Patent Number: 6,009,798
[45] Date of Patent: Jan. 4, 2000

[54] PRODUCT FEEDING AND COOKING APPARATUS

[75] Inventors: Brent A. Ledet, Metairie; Gregory L. Cooper, River Ridge, both of La.

[73] Assignee: The Laitram Corporation, Harahan, La.

[21] Appl. No.: 09/203,987

[22] Filed: Dec. 2, 1998

Related U.S. Application Data

[60] Provisional application No. 60/067,663, Dec. 5, 1997.

[51] Int. Cl.⁷ .................. A23L 3/00; A47J 27/04; A47J 27/16; A47J 43/18; A22C 29/00
[52] U.S. Cl. .................. 99/443 C; 99/386; 99/477; 99/516; 126/20; 126/369
[58] Field of Search ............... 99/443 R, 443 C, 99/467, 473–477, 483, 486, 516, 536, 403, 410, 404; 426/510, 511, 523; 452/5; 126/20, 369, 391

[56] References Cited

U.S. PATENT DOCUMENTS

| | | | |
|---|---|---|---|
| Re. 34,646 | 6/1994 | Lapeyre et al. | 99/443 C |
| 3,744,406 | 7/1973 | Lapeyre | 99/516 |
| 4,862,794 | 9/1989 | Lapeyre et al. | 99/477 X |
| 5,184,538 | 2/1993 | Ledet | 99/331 |
| 5,248,514 | 9/1993 | Ledet et al. | 426/523 |
| 5,410,951 | 5/1995 | Ledet et al. | 99/443 C |

*Primary Examiner*—Timothy Simone
*Attorney, Agent, or Firm*—James T. Cronvich

[57] ABSTRACT

Apparatus for feeding and cooking raw product, such as shellfish and the like, in a continuous process. A preferred version of the apparatus includes a feed tank with raw product immersed in a bath. A conveyor follows an inclined path starting in the feed tank and exiting the surface of the bath to convey raw product out of the tank and through a cooking chamber. A feed control mechanism is provided to allow for accurate setting of product flow. The mechanism includes a rocking paddle extending just above the conveying surface of the conveyor. The paddle is linked to a rotary drive train by a linkage consisting of two pivotally attached arms. Rotation of the drive train causes the paddle to rock and deposit product on the conveyor during each stroke. The drive train is mounted on a slidable support that is pivotally attached to an adjustment rod. The other end of the adjustment rod includes an adjustment handle and a micrometer-style adjustment with clearly visible indicia for adjusting product flow. As the adjustment rod is rotated, the drive train translates and changes the reference angle between the two arms of the linkage, which moves the paddle closer or farther from the conveying surface to adjust the amount of raw product deposited on the belt during each stroke. A cover over the feed tank provides a seal to prevent cooking steam from escaping the cooking chamber through the feed tank.

26 Claims, 4 Drawing Sheets

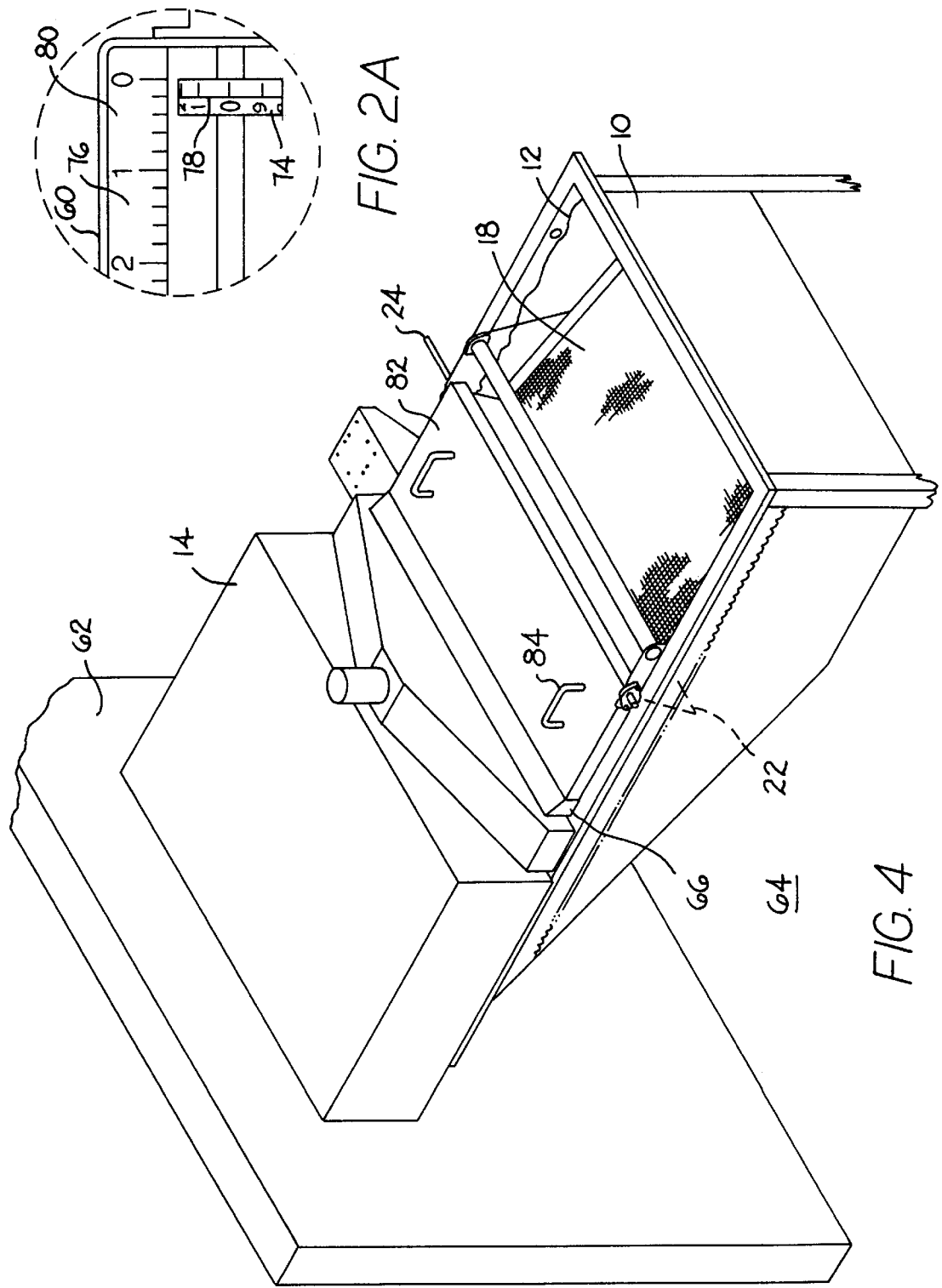

PRODUCT FEEDING AND COOKING APPARATUS

CROSS-REFERENCE TO RELATED APPLICATIONS

This application claims the benefit of U.S. Provisional Patent Application No. 60/067,663, filed Dec. 5, 1997.

BACKGROUND

The invention relates to apparatus for cooking raw product, such as shellfish and the like, and, more particularly, to a feed mechanism for accurately controlling the amount of product deposited on a conveyor belt for transport out of a feed tank into a cooking chamber.

Cooking shrimp and other shellfish in a continuous cooking process is well known. In cooking shrimp, for instance, raw shrimp in a feed tank are deposited on an endless conveyor belt that lifts the shrimp out of the tank into and through a cooking compartment in which the shrimp are cooked. At the exit end of the cooking compartment, the shrimp drop from the conveyor belt for further processing. For example, they can be dropped into a peeling apparatus that removes the shells through the action of counter-rotating rollers. Such a cooking/peeling apparatus is described in U.S. Pat. No. Re. 34,646, "APPARATUS FOR CONTROLLING PRE-COOKING AND MACHINE PEELING SHRIMP," issued Jun. 28, 1994. The patent also describes a feed mechanism for a fluid-filled tank that includes an oscillating feed paddle secured to a rocking shaft. A rocker arm extends from the rocking shaft to a pivotal connection with an adjustable-length pitman drive all. The other end of the pitman drive arm is pivotally attached to a rotary drive train. The rotary motion of the drive train imparts a swinging motion to the paddle through the arms. The throw range of each swing of the paddle is controlled by adjusting the length of the pitman arm. The throw determines the quantity of shrimp deposited by wave action on the conveyor belt.

In many applications, it is desirable for health reasons to separate raw product from cooked product. The Model CTSH Split Hood Pure Steam Cooker manufactured by Laitram Machinery, Inc. of Harahan, La., USA, for example, is designed to be installed through a physical divider or wall to separate product into low and high risk zones. The cooker is positioned with the raw product feed tank and the entrance end of the cooker in the low risk zone on one side of the divider and the exit end of the cooker through which the cooked shrimp pass in the high risk zone on the opposite side of the divider. In this way, contamination of cooked product in the high risk zone by migration of bacteria and other contaminants found in the raw product in the low risk zone is all but eliminated.

Nevertheless, human traffic between zones increases the chances of cross-contamination. Such traffic is often necessary when adjusting the product flow rate. Because the machine operator is usually stationed in the high risk zone and the flow rate is typically adjusted by varying the length of the pitman arm in the low risk zone, travel between the two zones is inevitable. A remote paddle adjuster having an adjustment handle in the high risk zone that hydraulically adjusts the length of the pitman arm to control the paddle and product flow is an optional accessory of the Laitram Model CTSH cooker. Such a remote adjustment tool does a good job of preventing cross-contamination, but is rather expensive. Like all hydraulic systems, it is also subject to air bubbles and other contaminants in the hydraulic lines, fluid leaks, and variations in settings with temperature and cook time. These shortcomings make remote, accurate, repeatable settings of product flow difficult.

In the feed tank and cooker systems described thus far, it is preferable to maintain the high risk zone at a higher atmospheric pressure than the low risk zone. This further keeps contaminants from migrating into the high risk zone. One shortcoming of this pressure differential, however, is that it causes a draft through the cooker from exit end to entrance end that tends to blow steam out through the entrance to the cooker in the vicinity of the feed tank. This escape of steam is energy inefficient.

Thus, there is a need for an inexpensive and accurate feed mechanism that can be remotely adjusted to control product flow from a feed tank onto a conveyor system for further processing. There is also a need for a feed tank that can be scaled to a cooker, for instance, to prevent the escape of useful cooking gases via the feed tank.

SUMMARY

These needs and others are satisfied by a product feeding and cooking apparatus having features of the invention, which includes a feed tank, a steam cooking chamber, and a conveyor for transporting product out of the feed tank into and through the cooking chamber. The feed tank is partially filled with a bath in which raw product is immersed. The conveyor follows an inclined path starting below the top level of the bath and exiting the feed tank to transport the raw product to the steam chamber. The feed tank further includes a feed mechanism for controlling product flow. The feed mechanism includes a paddle that extends generally across the width of the conveyor and spaced above its conveying surface in the bath. The paddle is linked to a rotary drive train by a linkage comprising two pivotally connected arms—a drive arm and a rocker arm. The angle between the drive arm and the rocker arm determines the closest point of approach of the rocking paddle to the conveying surface and the amount of product deposited each stroke. One version of an adjustment means for the paddle includes a movable support for the rotary drive train that can slide along the feed tank to adjust this reference angle and the closest point of approach. An adjustment rod is pivotably retained at one end to the movable support and threaded into a stationary support at its other end. An adjustment handle terminates the rod by which an operator can turn the rod to translate the rotary drive train, which changes the reference angle to adjust the closest point of approach of the paddle to adjust the amount of raw product deposited on the conveyor during each stroke of the paddle. In one version of the apparatus, the length of the drive arm is fixed and not adjustable to simplify the design. To allow for accurate remote setting of raw product flow out of the feed tank, the feed mechanism includes means for calibrating product flow. The calibration mechanism comprises visible indicia, such as a scale, positioned in the vicinity of the adjustment handle so that an operator can easily read the indicia and use them as a reference while adjusting product flow without having to look into the feed tank to check on paddle positioning. One version of the apparatus includes a barrel encircling the adjustment rod near the handle. The barrel has an enumerated Vernier scale around its circumference. A coarse enumerated scale is stationarily positioned along the adjustment rod. The coarse scale is spaced from the rod by a distance just greater than the radius of the barrel. As the rod and barrel rotate, they translate relative to the stationary coarse scale and provide a micrometer-style adjustment of product flow. All these versions help the operator adjust product flow even from relatively remote locations from the feed tank.

Another version of the invention, especially useful for cooking chambers installed through a wall or other divider, includes a cover over the feed tank. The cover extends at least from the paddle's rock shaft to the entrance end of the cooker to cover the top level of the bath between the paddle and the cooking chamber. The sides of the tank and the paddle and the level of the bath provide a water seal to substantially prevent, if not completely eliminate, cooking steam from escaping the cooking chamber through the feed tank, thereby ensuring efficient cooking.

DRAWINGS

These and other features, aspects, and advantages of the invention are better understood by reference to the following description, appended claims, and accompanying drawings, in which:

FIG. 4 is a perspective view of a feed tank and the entrance portion of a cooker as in FIG. 2 showing a sealing cover over the feed tank.

DESCRIPTION

Figure 1:
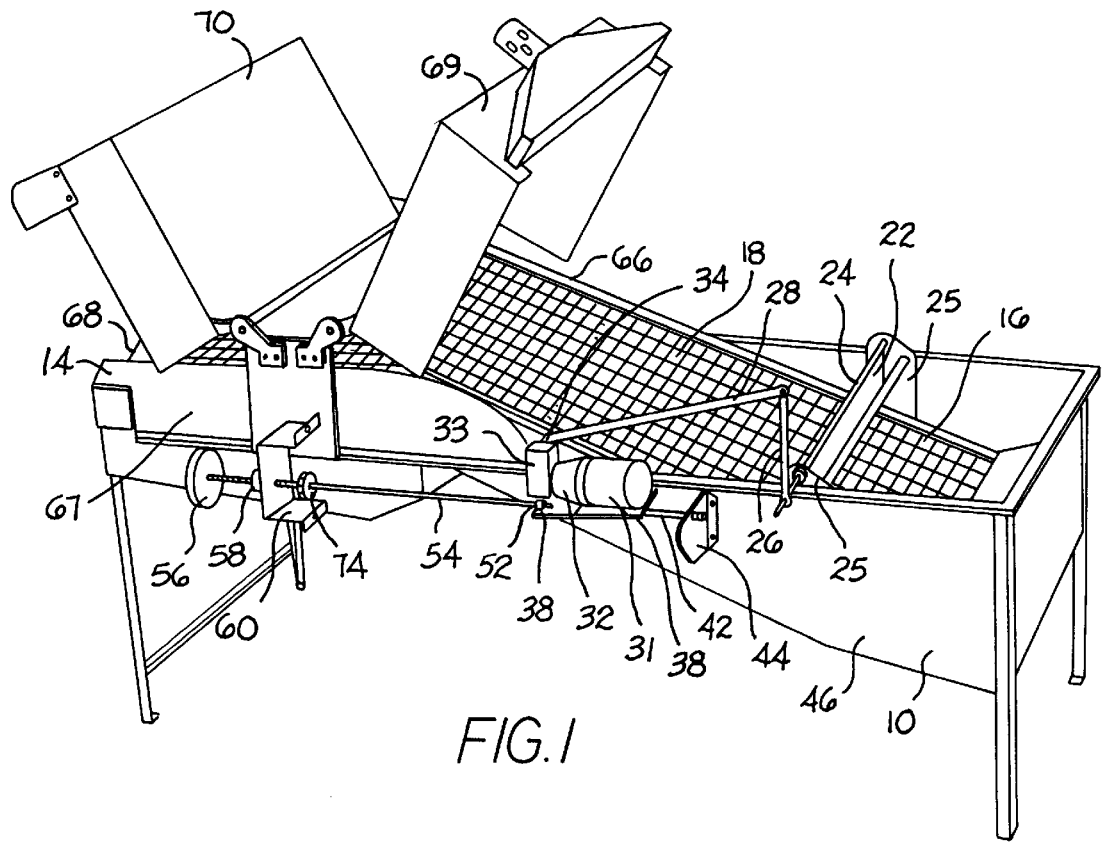
FIG. 1 is a perspective view of a cooker and feed tank arrangement embodying features of the invention.
Figure 2:
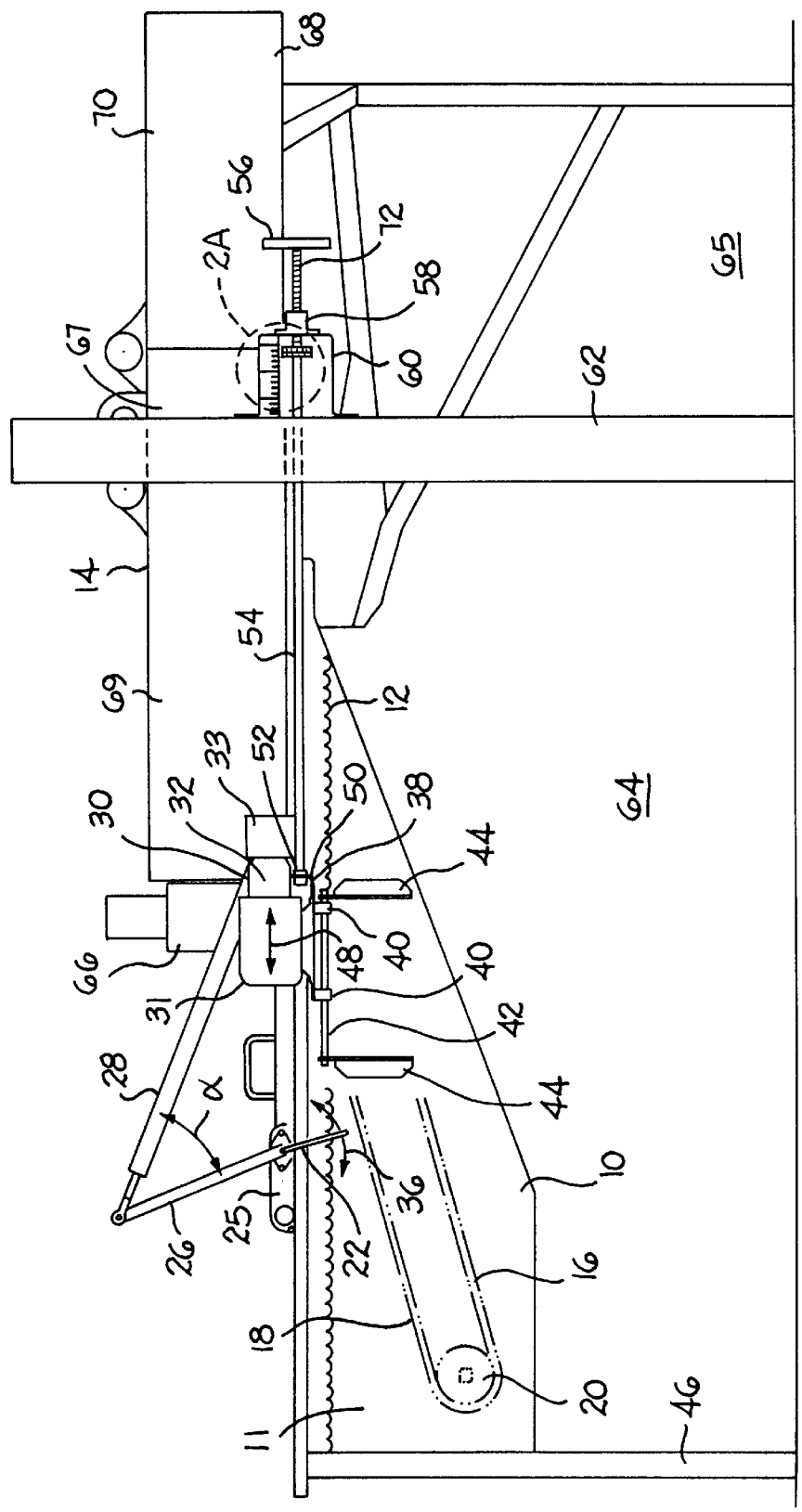
FIG. 2 is a side elevation view of the arrangement of FIG. 1 with closed cooker lids and separated into two zones by a barrier, and showing a blow-up of one version of a calibrated feed adjustment mechanism having features of the invention.

A feed tank 10 filled with raw product in a fluid bath 11, typically water, to a top level 12 is shown in FIGS. 1 and 2 attached to a cooker 14, such as a steam cooker, or blancher. The feed tank 10 includes an inclined conveyor belt 16 for transporting product out of the tank on the conveying surface 18 of the belt. The endless belt, which may be metal or plastic and typically has openings for drainage or steam penetration, is driven by a motor-driven roller or sprocket (not shown) and returns around an idler roller or sprockets 20. The feed tank 10 further includes a rocking paddle 22 extending across the width of the conveyor belt above the conveying surface 18. The paddle is secured to a rock shaft 24 journalled in sideplates 25. A rocker arm 26 extends from an end of the rock shaft 24 to a pivotal connection with one end of a drive arm 28. The drive arm can include a length adjuster, but is preferably of fixed length. The other end of the drive arm 28 is pivotally connected to a rotary drive train 30. The rotary drive train shown includes a motor 31 coupled to a speed reducer 32, which is in turn coupled to a drive converter 33. The drive converter has an output rotary shaft coupled to a crank block 34 pivotally connected near one end to the drive arm 28. The rotary drive train 30 imparts a rocking motion to the paddle 22 through the linkage comprising arms 26 and 28 as indicated by the double-headed arrow 36.

Figure 3:
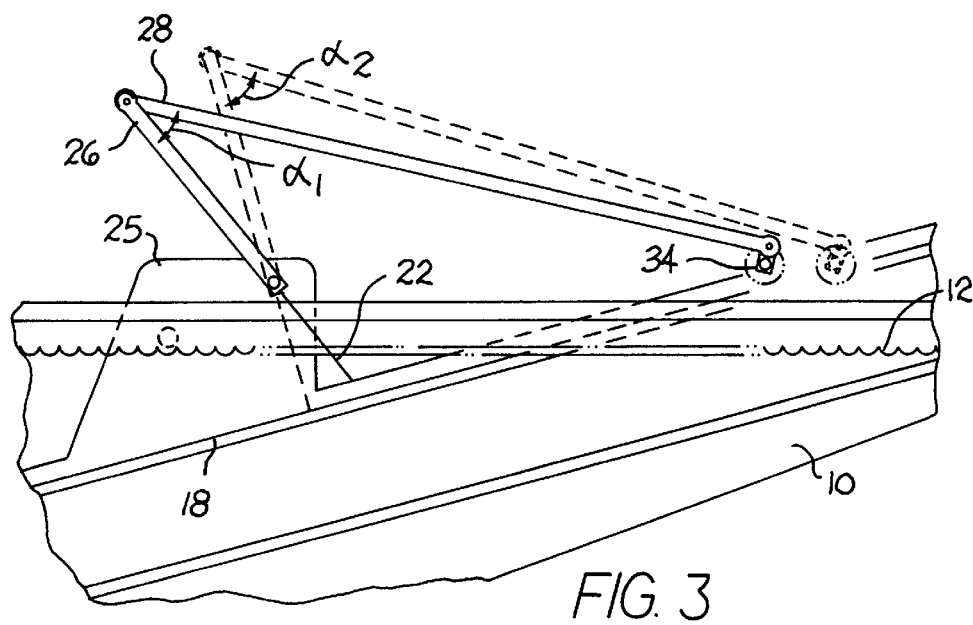
FIG. 3 is a partial side view of the feed tank portion of FIG. 1 showing two different paddle settings.

The amount of raw product deposited on the belt 16 for a given paddle stroke is determined by the closest point of approach of the tip edge of the paddle 22 to the conveying surface 18. The closer the approach, the more raw product is deposited on the belt and the greater the product flow out of the tank 10. As shown in FIG. 3, the closest point of approach can be adjusted by changing the reference angle α between the two arms. With the angle set to a value of $\alpha_1$, the paddle's reference position is advanced in the direction of belt travel, but lifted farther above the conveying surface 18 than for an angle setting $\alpha_2$, indicated by the arms and paddle shown in phantom lines. For a fixed length drive arm 28 and the same crank block 34 position, the change in angle can be accomplished by translating the drive train 30 as indicated in FIG. 3. Thus, in the phantom position of reference angle $\alpha_2$, the paddle deposits more product by wave action onto the conveying surface 18 than in the position corresponding to reference angle $\alpha_1$. In this way, product flow can be controlled.

Translation of the rotary drive train 30 can be accomplished by the feed mechanism shown in FIGS. 1 and 2. The drive train is mounted on a movable support 38. The support sits on a pair of roller bearings 40 slidably coupled to a slide bar 42 supported by brackets 44 attached to the frame 46 of the feed tank. The sliding engagement of the support 38 with the stationary slide bar 42 permits the drive train to translate as indicated by the double-headed arrow 48 and thereby adjust reference angle α to control product flow.

A flange 50 extending upwardly from the support 38 includes bearing 52 rotatably retaining one end of an adjustment rod 54. The other end of the adjustment rod is threaded and terminates in a handle 56. The threaded portion of the rod engages a threaded coupling 58 attached to a bracket 60, which is held stationary relative to the rock shaft 24, especially, and to the feed tank frame 46 generally. The bracket 60 is shown in FIG. 2 attached to a dividing wall 62 or other barrier. The bracket 60 could just as well be affixed to the frame of the cooker 14 to keep it stationary relative to the rock shaft. An operator adjusts the flow rate by turning the handle 56 of the adjustment rod 54. As the rod turns, it advances through the threaded coupling 58 to translate the slidable drive train 30 and adjust the reference angle α to increase or decrease product flow.

Although the feed tank 10 could be used to feed various products to a variety of processing machines, it is shown in the figures in conjunction with a steam cooker 14. More particularly, it is shown with a split-hood steam cooker, such as a Laitram Model CTSH steam cooker manufactured by Laitram Machinery, Inc. of Harahan, La., USA. As shown in FIGS. 2 and 4, the cooker 14 is installed through a wall 62 or other barrier to divide the processing path into two zones: a low risk zone 64 on the feed tank side of the wall and a high risk zone 65 on the opposite side of the wall where cooked product exits the cooker 14. Raw product, especially shellfish such as shrimp, in the low risk zone 64 typically teem with bacteria and other contaminants that must be isolated from the cooked product in the high risk zone 65. The barrier 62 provides isolation. Furthermore, the high risk zone is often pressurized relative to the low risk zone to further prevent contaminants from migrating into the high risk zone. Human traffic between zones is also limited to avoid contamination.

As previously mentioned, the cooker 14 depicted in the figures is a steam cooker, whose cooking principle of operation is described in U.S. Pat. No. Re. 34,646, "APPARATUS FOR CONTROLLING PRE-COOKING AND MACHINE PEELING SHRIMP," incorporated herein by reference. The steam cooker is generally open to the atmosphere at each end. The conveyor belt 16 transports product out of the feed tank bath 11 into the entrance end 66 of the cooker. The belt further transports the product through the cooking chamber 67, where it is cooked by steam in a continuous cooking process, and out the exit end 68, where the product may drop onto an attached peeling or other processing apparatus (not shown). For easy access to the cooking chamber 67, the hood of the cooker includes two hinged lids 69, 70—one on each side of the barrier 62. During cooking, the lids are down; during cleaning, they are raised as shown in FIG. 1.

Because the cooker 14 is straddled by the barrier 62 and the operator monitoring the output of the cooker is typically stationed in the high risk zone 65, it is inconvenient as well as unsanitary for him to shuttle back and forth between zones to adjust product flow. To simplify the adjustment of product flow, the adjustment rod 54 extends through an opening in the barrier 62 with the adjustment handle 56 in the high risk zone 65 where the operator is stationed. The feed mechanism includes the additional feature of a means for calibrating the product flow accurately and repeatably. One means for calibrating, as shown in FIG. 2 and blow-up FIG. 2A, includes a micrometer-type adjustment. The threads 72 of the adjustment rod 54 and the threads of the threaded coupling 58 are precisely machined to provide an accurate advance of the rod with rotation. Visible indicia, representing the advance of the rod and thereby the closest point of approach of the paddle 22 to the conveying surface 18, are disposed near the handle to permit the operator to adjust product flow without having to shuttle back and forth between the low and high risk zones. Analog micrometer-style indicia are depicted in FIG. 2, in which a barrel 74 is affixed to the rod 54. A clearly visible Vernier scale is imprinted or etched on the circumference of the barrel. As in a micrometer, a coarse scale 76 is affixed nearby along the axis of the rod and spaced from it a distance slightly greater than the circumference of the barrel. An indicator, such as a band 78, around the circumference of the barrel translates along with the rod as it rotates. The indicator indicates the coarse scale reading, and the enumerated Vernier scale indicates the fractional reading. One rotation of the rod translates the barrel and its indicator one coarse division. The enumerated coarse scale 76 can be imprinted or etched on a plate 80 attached to the supporting bracket 60, to the side of the cooker 14, or in any manner to be close to the Vernier scale. The scales could be laid out in different units. As one example, the scale could be linear in inches or centimeters of translation of the rotary drive train 30. Alternatively, the scale could be in units corresponding to the closest point of approach of the paddle to the conveying surface. As another example, the scale could be marked in units of product flow, such as pounds per minute.

Just as micrometers have analog scales of the type depicted here, many also have a digital readout, such as a liquid crystal display. A digital readout in conjunction with an electronic measurement of rod rotation would be just One example of an equivalent way of providing the operator with visible indicia of paddle position. Another example of an equivalent display is a circular dial with a rotating needle indicator. Thus, the feed mechanism can be adjusted remotely and accurately by an operator without forcing him to look at the actual paddle position as he adjusts product flow.

Figure 5:
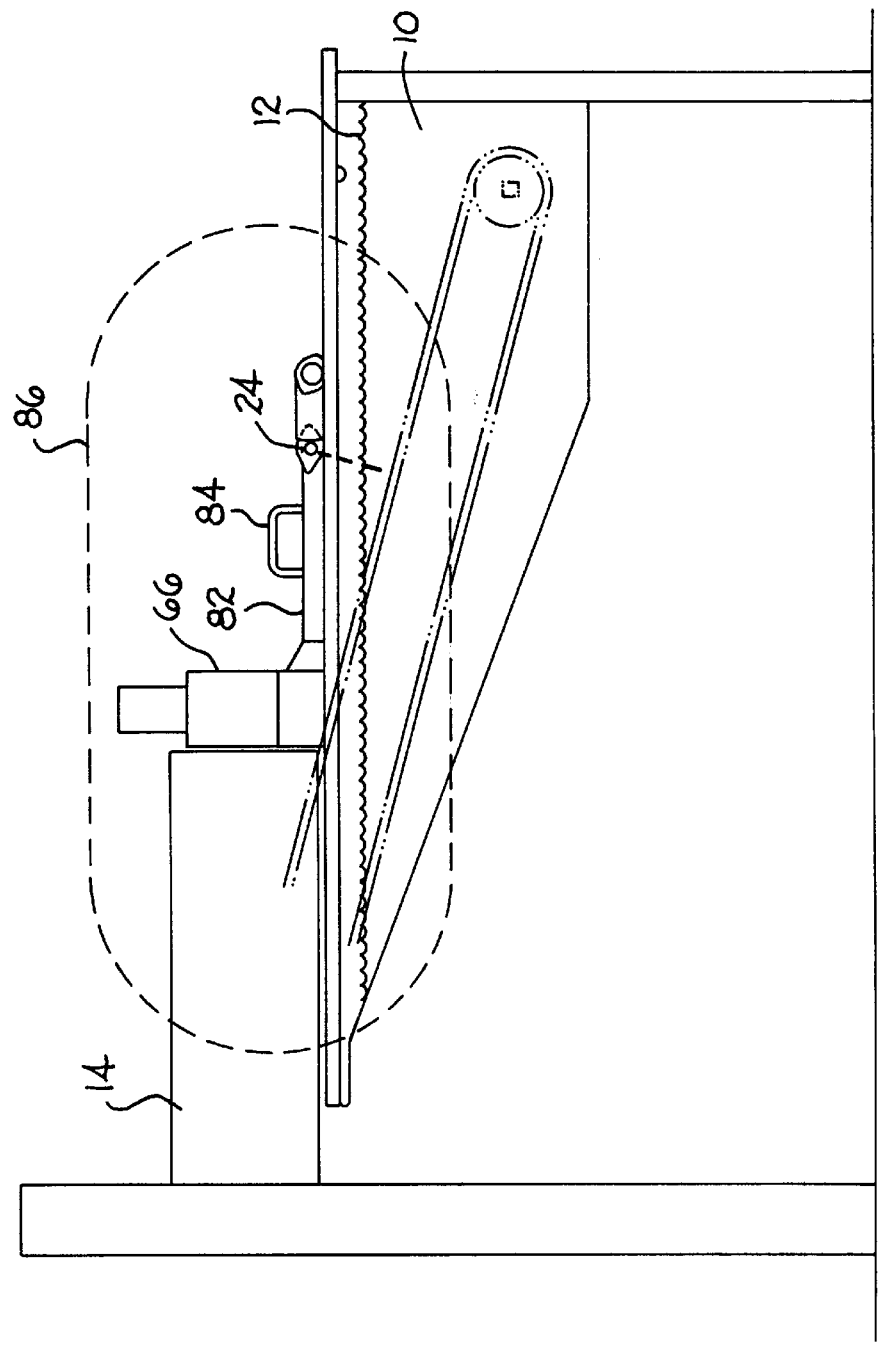
FIG. 5 is a side elevation view of the feed tank and cooker entrance as in FIG. 4 showing the sealed region of the arrangement.

As previously mentioned, it is common practice to pressurize the high risk zone 65 to further impede the immigration of contaminants. With a standard steam cooker, however, pressurizing the high risk zone causes a draft that can flow through the cooking chamber 67 from the exit end 68 to the entrance end 66. This draft can force working steam out of the entrance of the cooker and into the atmosphere, wasting cooking energy. To prevent this waste of steam, one version of the feed tank, best shown in FIGS. 4 and 5, is outfitted with a cover 82 extending from the entrance end 66 of the cooker 14 at least as far as the rock shaft 24 of the feed mechanism. Cutouts in the sides of the cover fitted with seals, such as of TEFLON, admit the rock shaft and allow the cover 82 to rest on it in a sealed arrangement. The cover could be hinged at either end or completely removable by handles 84 to allow access for maintenance. Its weight would be generally sufficient to prevent steam from escaping. The bottom edges of the cover could include gasket material for an even better seal against the rim of the feed tank. Because of the cover, the paddle 22, and the sides of the feed tank 14, the top level 12 of the bath 16 creates a water seal that prevents steam from escaping via the feed tank. The result is a sealed volume indicated by dashed lines 86 that improves the cooking and energy efficiency of the cooker.

Although the invention has been described in detail with reference to preferred versions, other versions are possible. For example, the steam-sealing cover could extend over more of the feed tank. As another example, the adjustment means described in detail herein as an adjustment rod extending from the handle to the movable drive train support could be replaced by a remotely-controlled radio or other electronic device with a receiver and drive mechanism at the feed tank to translate the drive train with equivalent results. The remotely-adjustable feed mechanism feature described could be used with other than cooking equipment to control product flow to other processing equipment. Therefore, the spirit and scope of the claims are not limited to the description of the preferred version.

What is claimed is:

1. Apparatus for cooking a raw product, such as shellfish, in a continuous cooking process, comprising:

a feed tank containing raw product in a bath partially filling the feed tank to a top level;

a cooking chamber disposed proximate the feed tank;

a belt conveyor having a conveying surface that follows an inclined path starting below the top level of the bath in the feed tank and exiting the feed tank to convey raw product on the conveying surface out of the feed tank to be transported continuously through the cooking chamber;

and a feed control mechanism comprising:

a paddle extending generally across the width of the conveying surface and spaced above the conveying surface below the top level of the bath, a drive train, including a motor, slidably attached at the feed tank, a linkage linking the drive train to the paddle to cause the paddle to rock through a stroke including a closest point of approach of the paddle to the conveying surface, the linkage including a pair of arms pivotally connected together and forming a reference angle between the arms, and adjustment means for slidably adjusting the position of the drive train relative to the paddle and thereby changing the reference angle to adjust the closest point of approach of the paddle to the conveying surface to control the amount of raw product deposited on the conveying surface during each stroke.

2. Apparatus as in claim 1 wherein the cooking chamber is a steam cooking chamber having an entrance end proximate the feed tank and an opposite exit end and the apparatus further comprises a feed tank cover extending at least from the paddle to the entrance end of the steam cooking chamber to form a seal together with the paddle and the top level of the bath to prevent the escape of steam from the cooking chamber through the feed tank into the atmosphere.

3. Apparatus as in claim 2 wherein the feed tank cover is hingedly attached to the feed tank.

4. Apparatus as in claim 1 further comprising a barrier and wherein the cooking chamber has an entrance end proximate the feed tank and an opposite exit end and wherein the feed tank and the entrance end of the cooking chamber handling raw product are separated from the exit end of the cooking chamber handling cooked product by the barrier disposed around the cooking chamber between the entrance end and the exit end and further comprising means for calibrating the amount of raw product deposited on the conveying surface during each stroke of the paddle, the means for calibrating being associated with the adjustment means and being disposed on the exit end side of the barrier.

5. Apparatus as in claim 1 further comprising means for calibrating the amount of raw product deposited on the conveying surface during each stroke of the paddle, the means for calibrating including visible indicia indicative of the closest point of approach of the paddle to the conveying surface and disposed so that the indicia can be easily read by an operator adjusting product flow.

6. Apparatus as in claim 5 wherein the indicia are depicted in units of the closest point of approach of the paddle to the conveying surface.

7. Apparatus as in claim 1 further comprising a movable support for the drive train and wherein the adjustment means comprises a stationary support and an adjustment rod pivotably attached at one end to the movable support for the drive train and threadedly attached at the other end to the stationary support, the adjustment rod including an adjustment handle to rotate the rod and translate the movable support and the drive train to control the amount of raw product deposited on the conveying surface during each stroke.

8. Apparatus as in claim 7 further comprising means for calibrating the closest point of approach of the paddle to the conveying surface including a barrel affixed to and surrounding the adjustment rod near the handle, the barrel rotating and translating with the rod as the rod is adjusted and including a first enumerated scale disposed around the circumference of the barrel, the means for calibrating further comprising a surface mounted on the stationary support and having a second enumerated scale along an edge of the surface parallel to the adjustment rod and spaced from the rod by a distance just greater than the radius of the barrel to provide for accurate mechanical micrometer-like adjustment of product flow.

9. Apparatus as in claim 1 further comprising means for calibrating the amount of raw product deposited on the conveying surface during each stroke of the paddle, the means for calibrating being located remotely from the feed tank.

10. Apparatus as in claim 1 wherein the pair of arms are unadjustably fixed in length.

11. Apparatus for cooking a raw product, such as shellfish, in a continuous cooking process, comprising:
a feed tank containing raw product in a bath partially filling the feed tank to a top level;
a steam cooking chamber disposed proximate the feed tank;
a belt conveyor having a conveying surface that follows an inclined path starting below the top level of the bath in the feed tank and exiting the feed tank to convey raw product on the conveying surface out of the feed tank to be transported continuously through the cooking chamber for steam cooking; and
a feed control mechanism, comprising:
a paddle extending generally across the width of the conveying surface and spaced above the conveying surface below the top level of the bath;
a rotary drive train;
a linkage linking the rotary drive train to the paddle to transform the rotary motion of the drive train into rocking motion of the paddle through a stroke including a closest point of approach of the paddle to the conveying surface, the linkage including a drive arm and a rocker arm pivotally connected together and forming a reference angle between the arms;
a movable support for the drive train slidably attached at the feed tank;
a stationary support disposed near the cooking chamber;
an adjustment rod pivotably retained at one end to the movable drive train support and threadedly attached at the other end to the stationary support, the adjustment rod including an adjustment handle to rotate the rod to translate the movable support and the drive train relative to the paddle and thereby changing the reference angle to adjust the closest point of approach of the paddle to the conveying surface to control the amount of raw product deposited on the conveying surface during each stroke.

12. Apparatus as in claim 11 wherein the drive arm is unadjustably fixed in length.

13. Apparatus as in claim 11 further comprising a barrier and wherein the cooking chamber has an entrance end proximate the feed tank and an opposite exit end and wherein the feed tank and the entrance end of the cooking chamber handling raw product are separated from the exit end of the cooking chamber handling cooked product by the barrier disposed around the cooking chamber between the entrance end and the exit end and wherein the adjustment rod extends through an opening in the barrier with the adjustment handle residing on the same side of the barrier as the exit end of the cooking chamber.

14. Apparatus as in claim 13 further comprising a feed tank cover extending at least from the paddle to the entrance end of the steam cooking chamber to form a seal together with the paddle and the top level of the bath to prevent the escape of steam from the cooking chamber through the feed tank into the atmosphere.

15. Apparatus as in claim 11 further comprising means for calibrating the amount of raw product deposited on the conveying surface during each stroke of the paddle, the means for calibrating including visible indicia indicative of the closest point of approach of the paddle to the conveying surface, the visible indicia disposed in the vicinity of the adjustment handle so that the indicia can be easily read by an operator adjusting product flow.

16. Apparatus as in claim 15 wherein the means for calibrating comprises a barrel affixed to and surrounding the adjustment rod near the handle, the barrel rotating and translating with the rod as the rod is adjusted and including a first enumerated scale disposed around the circumference of the barrel, the means for calibrating further comprising a surface mounted on the stationary support and having a second enumerated scale along an edge of the surface parallel to the adjustment rod and spaced from the rod by a distance just greater than the radius of the barrel to provide for mechanical micrometer-like adjustment of product flow.

17. Apparatus for cooking a raw product, such as shellfish, in a continuous cooking process, comprising:
a feed tank containing raw product in a bath partially filling the feed tank to a top level;
a steam cooking chamber disposed proximate the feed tank;
a belt conveyor having a conveying surface that follows an inclined path starting below the top level of the bath in the feed tank and exiting the feed tank to convey raw product on the conveying surface out of the feed tank to be transported continuously through the cooking chamber for steam cooking; and a feed control mechanism, comprising:

a paddle extending generally across the width of the conveying surface and spaced above the conveying surface below the top level of the bath;

a rock shaft attached to the paddle at an end opposite the conveying surface and journalled in the feed tank to rock the paddle through a stroke;

a motor;

a drive train coupled to the motor;

a movable support for the drive train;

a crank block coupled to the drive train and rotated by the motor by means of the drive train;

a rocker arm attached at one end to the rock shaft;

a drive arm pivotably attached at one end to the end of the rocker arm opposite the rock shaft and forming a reference angle between the rocker arm and the drive arm and pivotally attached at the other end to the crank block, whereby rotation of the crank block causes the paddle to rock through a stroke including a closest point of approach between the paddle and the conveying surface;

a stationary support disposed near the cooking chamber;

an adjustment rod pivotably retained at one end to the movable drive train support and threadedly attached at the other end to the stationary support, the adjustment rod including an adjustment handle to rotate the rod to translate the movable support and the drive train relative to the paddle and thereby changing the reference angle to adjust the closest point of approach of the paddle to the conveying surface to control the amount of raw product deposited on the conveying surface during each stroke.

18. A feed control mechanism for accurately controlling the rate of product deposited on the conveying surface of a conveyor transporting the product out of a water-filled product feed tank, comprising:

a rocking paddle extending generally across the width of the conveying surface and spaced above the conveying surface beneath the top surface of the water in the feed tank;

a drive train;

a linkage linking the drive train to the rocking paddle to cause the rocking paddle to rock through a stroke including a closest point of approach of the rocking paddle to the conveying surface, the linkage including a pair of arms pivotally connected together and forming a reference angle between the arms;

a movable support for the drive train slidably attached at the feed tank; and adjustment means for slidably adjusting the position of the movable support and the drive train relative to the paddle and thereby changing the reference angle to adjust the closest point of approach of the rocking paddle to the conveying surface to control the amount of product deposited on the conveying surface during each stroke.

19. A mechanism as in claim 18 further comprising means for calibrating the amount of product deposited on the conveying surface during each stroke of the rocking paddle, the means for calibrating including visible indicia indicative of the closest point of approach of the rocking paddle to the conveying surface and disposed so that the indicia can be easily read by an operator adjusting product flow.

20. A mechanism as in claim 19 wherein the indicia are depicted in units of the closest point of approach of the rocking paddle to the conveying surface.

21. A mechanism as in claim 18 wherein the adjustment means comprises a stationary support and an adjustment rod pivotably attached at one end to the movable support for the drive train and threadedly attached at the other end to the stationary support, the adjustment rod including an adjustment handle to rotate the rod and translate the movable support and the drive train to control the amount of product deposited on the conveying surface during each stroke.

22. A mechanism as in claim 21 further comprising means for calibrating the closest point of approach of the rocking paddle to the conveying surface including a barrel affixed to and surrounding the adjustment rod near the handle, the barrel rotating and translating with the rod as the rod is adjusted and including a first enumerated scale disposed around the circumference of the barrel, the means for calibrating further comprising a surface mounted on the stationary support and having a second enumerated scale along an edge of the surface parallel to the adjustment rod and spaced from the rod by a distance just greater than the radius of the barrel to provide for accurate mechanical micrometer-like adjustment of product flow.

23. A mechanism as in claim 18 further comprising means for calibrating the amount of product deposited on the conveying surface during each stroke of the rocking paddle, the means for calibrating being located remotely from the feed tank.

24. A mechanism as in claim 18 wherein the pair of arms are unadjustably fixed in length.

25. Apparatus for cooking a raw product, such as shellfish, in a continuous steam cooking process, comprising:

a feed tank containing raw product in a bath partially filling the feed tank to a top level;

a steam cooking chamber disposed proximate the feed tank, the steam cooking chamber having an entrance end and an exit end;

a barrier disposed around the steam cooking chamber between the entrance end and the exit end and dividing the apparatus between a low risk zone around the entrance end and a pressurized high risk zone at the exit end;

a belt conveyor having a conveying surface that follows an inclined path starting below the top level of the bath in the feed tank and exiting the feed tank to convey raw product on the conveying surface out of the feed tank to be transported continuously through the steam cooking chamber from the entrance end to the exit end for steam cooking;

a rocking paddle pivotably attached to the feed tank and extending generally across the width of the conveying surface and spaced above the conveying surface below the top level of the bath for depositing raw product on the conveying surface; and a feed tank cover extending at least from the rocking paddle to the entrance end of the steam cooking chamber to form a seal together with the rocking paddle and the top level of the bath to prevent the escape of steam, urged from the pressurized high risk zone at the exit end toward the low risk zone at the entrance end, from the cooking chamber through the feed tank into the atmosphere.

26. Apparatus as in claim 25 wherein the feed tank cover is hingedly attached to the feed tank.

* * * * *